UNITED STATES PATENT OFFICE.

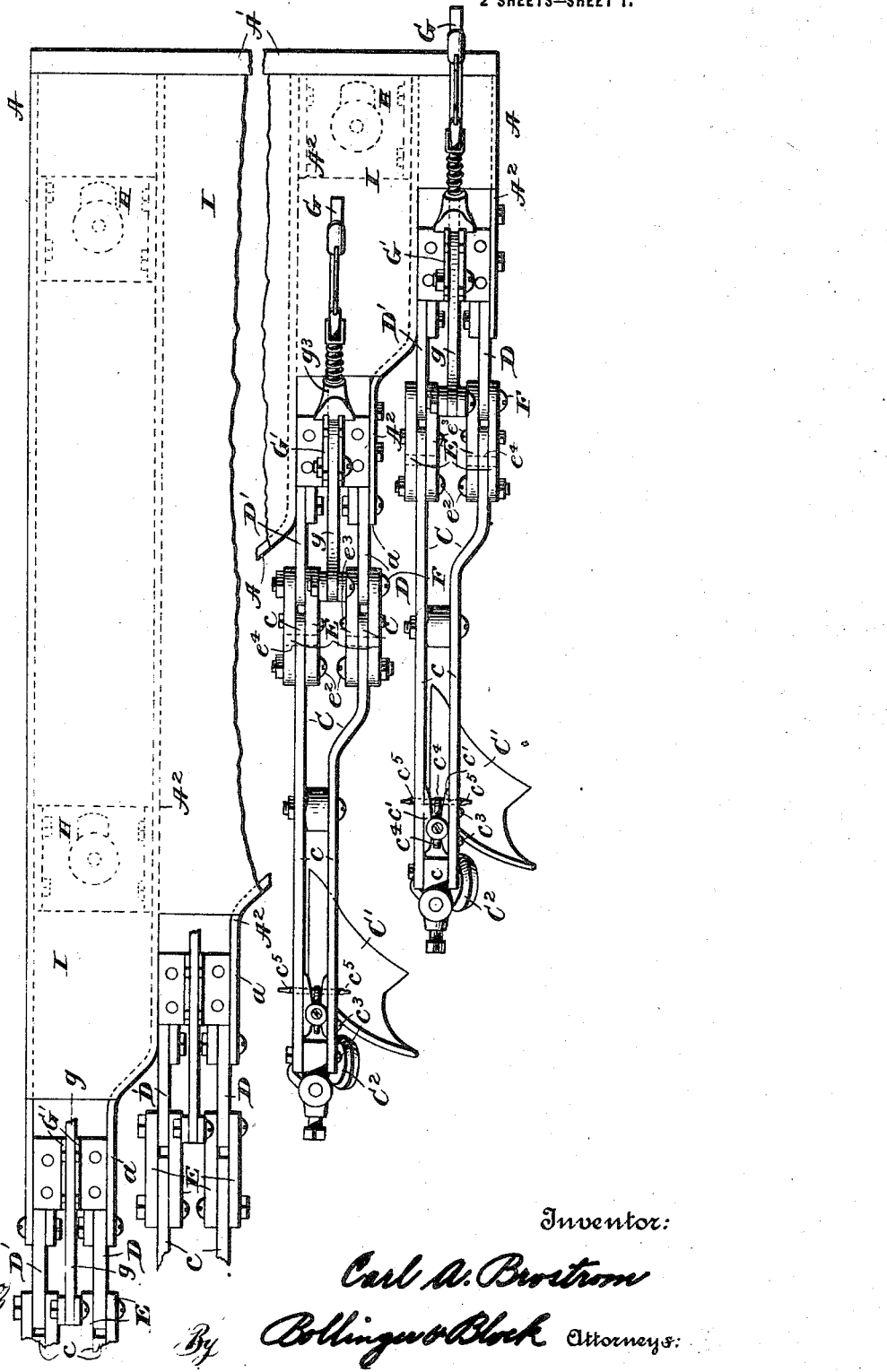

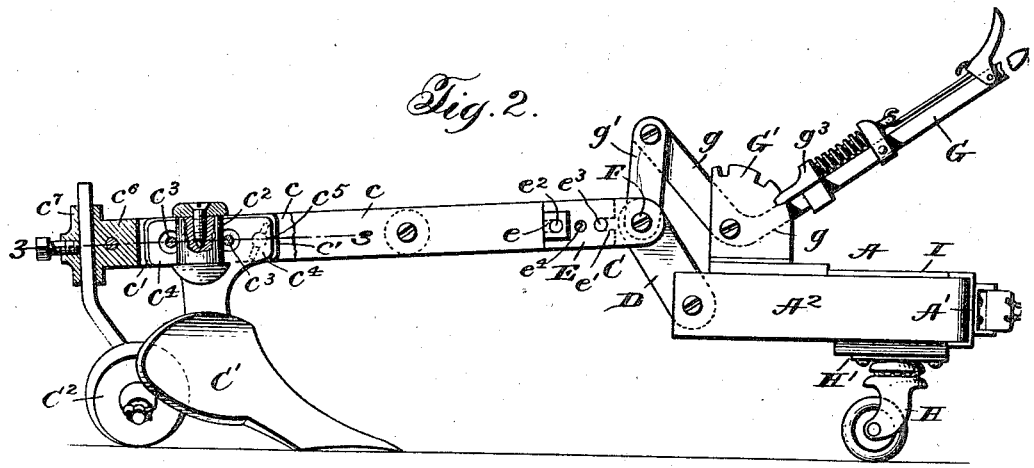
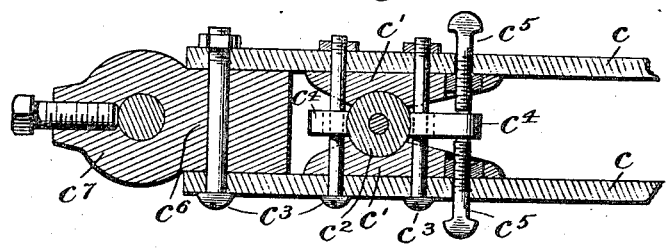
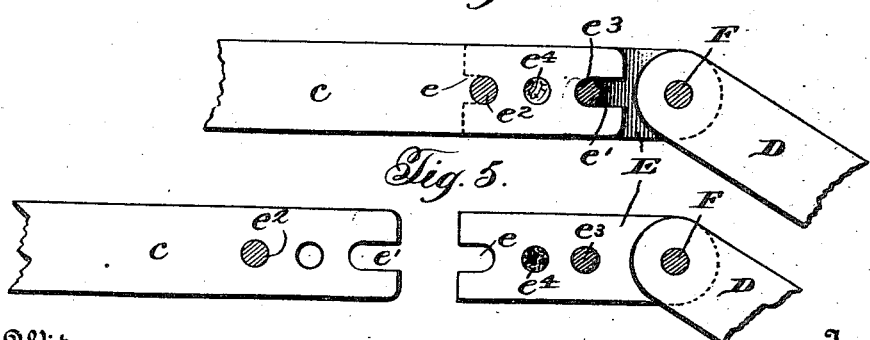

CARL A. BROSTROM, OF MOLINE, ILLINOIS.

GANG-PLOW.

1,139,751.

Specification of Letters Patent.

Patented May 18, 1915.

Application filed November 16, 1911. Serial No. 660,570.

*To all whom it may concern:*

Be it known that I, CARL A. BROSTROM, a citizen of the United States, residing at Moline, in the county of Rock Island and State of Illinois, have invented certain new and useful Improvements in Gang-Plows, of which the following is a specification, reference being had therein to the accompanying drawing.

This invention relates to an improvement in gang plows and more particularly to plows of this character which are designed to be used in connection with motor driven tractors.

The object of the present invention is the provision in a device of this character of improved means for adjusting the elevation of the plows, so that the said plows may be caused to cut into the soil to any desired depth or may be elevated entirely above the ground when the machine is being transported from place to place.

A further object of the invention is the provision of lever mechanism for adjusting each of the plows of such a character that the lever will always remain in the position to which it is adjusted by the operator regardless of any movement of the plow in operation.

A further object of the invention is the provision of improved means for coupling each of the plow beams to the main frame in such a manner that it will readily become detached therefrom when the plow is subjected to any unnecessary strains, and thus preventing injury of the main frame and other parts of the device.

Other objects of the invention will be apparent from the detailed description hereinafter, when read in connection with the accompanying drawings forming a part hereof wherein a convenient embodiment of the invention is illustrated and wherein like characters of reference refer to similar parts in the several views.

In the drawings:—Figure 1 is a perspective view of the improved gang plow; Fig. 2 is a side elevation showing one of the plow beams and its connection with the frame, with parts shown in section. Fig. 3 is a section taken on the line 3—3 of Fig. 2, and Figs. 4 and 5 are detail views illustrating the connection between the front ends of the plow beams with the frame.

Referring now more particularly to the drawings, A designates the frame of the improved gang plow which comprises a front bar A', which may be conveniently formed of channel iron, and from which extend at substantially right angles thereto a plurality of rearwardly extending bars $A^2$. The rearwardly extending bars $A^2$ are spaced from each other and said bars increase in length from one side of the plow frame to the other so that the rear end of the plow frame is inclined and it is from this inclined end of the plow frame that the plow beams are supported as will be hereinafter more particularly set forth. The two outermost rearwardly extending bars $A^2$ of the plow frame are straight, while each of the intermediate rearwardly extending bars $A^2$ is provided at its rear end with a portion $a$ which is off set from the main portion of the bar and extends parallel thereto, the rear end of the off set portion of each of said bars being positioned opposite the portion of the adjacent bar immediately in advance of the off set portion of said adjacent bar. This construction provides the necessary space between the plow beams for the proper operation of the plows carried thereby. By the construction thus described, there is provided between the free end of each of the rearwardly extending bars $A^2$ of the frame, and the bar adjacent thereto, a space in which is secured supporting means for one of the plow beams C. The plow beams C are similarly formed and are of the same size, so that when such beams are coupled to the frame, the several plows are arranged in a row extending at an angle to the front bar A' of the frame. Each of the plow beams is provided with a suitable plow share C' rigidly secured in any suitable manner adjacent the rear end thereof and with a supporting roller $C^2$ which is positioned in rear of the plow share C' and is conveniently secured to the plow beam in such a manner that it can be adjusted vertically.

In the embodiment of the invention illustrated in the accompanaying drawings, I have shown each of the plow beams as being formed of two metallic bars $c$ which are rigidly secured together in any suitable manner in spaced relation, the standard of the plow share C' being rigidly secured in any suitable manner between the bars $c$ of said beam adjacent the rear end thereof. In practice I prefer to so mount the standards of the plow share C' in the beam in such a manner that the plow may be angularly adjusted when it is found desirable to do so. To this end a pair of separated blocks $c'$ $c'$ are positioned between the metallic bars $c$ forming the beam, the adjacent faces of which blocks are provided with curved seats which are adapted to embrace a cylindrical portion $c^2$ formed adjacent the upper end of the plow standard. The blocks $c'$ are retained in position by means of securing bolts $c^3$ which pass through such blocks and the metallic bars $c$ of the plow beam, two of such bolts being preferably utilized positioned one upon each side of the bearing portions provided in the blocks $c'$.

When the securing bolts $c^3$ are tightened, the flexibility of the metallic bar $c$ of the beam enables said blocks to be forced tightly in engagement with the cylindrical portion $c^2$ of the plow standard. To prevent any accidental movement of the plow standard between the blocks $c'$, said standard is provided with a portion $c^4$ which extends forwardly and rearwardly from the cylindrical portion $c^2$ and is positioned between the bearing blocks $c'$. Threaded in the bars $c$ of the beam C and passing through portions of the bearing blocks $c'$ are set screws $c^5$ the inner ends of which are adapted to contact with the opposite surfaces of the projection $c^4$ which extend forwardly from the plow standard. From this construction it will be seen that by means of the set screws $c^5$, the plow standard may be shifted between the bearing blocks $c'$ to any desired extent, and securely locked in this shifted position. The portion $c^4$ which projects from the plow standard is provided with suitable slots therein permitting the passage therethrough of the clamping bolts $c^3$. The plow standard is formed with suitable collars at the upper and lower portions of the cylindrical portion $c^2$ thereof, which are adapted to lie upon the upper and lower surface of the bearing blocks $c'$ so as to prevent any vertical movement of the plow standard therein. By means of the construction thus described, the plow may be set at any desired angle relative to the beam. This construction is also of importance as it enables the plow to be so adjusted that it will run in a straight line even if the beam should be bent to a slight extent.

Secured within the rear ends of the bars $c$ of each of the beams C, is a block $c^6$ which carries a vertically disposed sleeve $c^7$ in which is adjustably secured by a set screw or other suitable means, the standard which carries the roller $C^2$.

Each of the plow beams C is coupled to the plow frame A in the same manner and I will therefore describe in detail only the construction for securing one of said beams to the frame. Pivotally connected in any suitable manner to the inner face of the short outside bar $A^2$ of the frame A, is a short link D and pivotally secured to the inner face of the bar $A^2$ of the frame A adjacent said last mentioned bar is a similar link D'. The link D' is pivotally connected to the bar $A^2$ of the frame immediately in advance of the off set portion $a$ therein and the pivots of the links D and D' are in alinement. The outer end of one of the plow beams C is pivotally connected to the free ends of the links D and D' and in the present embodiment of the invention I have utilized a connection for this purpose of such a construction that it will break when the plow is subjected to undue or heavy strains. The coupling utilized for this purpose comprises two pairs of plates E E, the plates of each pair being secured upon opposite sides of the bars $c$ of the beam C and projecting therebeyond, the projecting ends of such pairs of plates embracing the free ends of the links D and D' and being pivotally connected thereto by means of a suitable bolt F which passes therethrough. The rear ends of all of the plates E are provided with slots $e$ extending inwardly therefrom and securing bolts $e^2$ pass through the slots in said plates and suitable apertures formed in the interposed bars $c$ of the plow beam C. The bars $c$ of the plow beam C are provided with slots $e'$ extending inwardly from the forward ends thereof and passing through said slots and alined openings in the plates E are secured bolts $e^3$. The bars $c$ of the plow beam C and the plates E E positioned on the exterior thereof are provided intermediate the securing bolts $e^2$ and $e^3$ with alined apertures therein in which are positioned pins $e^4$ which may be made of any suitable frangible material. From this construction it will be seen that the plow beam is connected to the links D and D' in a manner which will resist any ordinary strains but that if the plow should be subjected to any undue strains, the frangible pins $e^4$ would break which would permit the ends of the beams $c$ of the plow beams to pull out from between the plates E. After the obstruction has been passed the beam which has been thus separated from the main frame of the plow can be readily restored to its normal position, new frangible pins $e^4$ being utilized.

Pivotally supported upon the main frame A of the plow is a hand lever G which is provided at the lower end thereof with a laterally extending portion $g$ which overlies and is positioned between the links D and D' heretofore described. The free end of the rearwardly extending portion $g$ is connected to the links D and D' in such a manner that by manipulating the hand lever G said links may be raised and lowered.

In the present embodiment of the invention links $g'$ are utilized for this purpose, the upper ends of said links being pivotally connected in any suitable manner to the free end of the rearwardly extending portion $g$ of the lever G and the lower ends of said links embracing the pivot bolt F which serves to connect the free ends of the links D and D' to the outer end of the plow beam C. A suitable rack G' is provided on the frame of the machine and the hand lever G is provided with a suitable pawl $g^3$ of any well known construction adapted for engagement with said rack to hold the hand lever G in any desired position of adjustment. The lever G is conveniently pivoted to a supporting member which is bolted between the rearwardly extending bars $A^2$ of the frame to which are pivotally connected the links D and D'. This supporting member also serves to effectively brace the rearwardly extending bars $A^2$ of the frame.

From the construction thus described it will be seen that by manipulating the hand lever G the links D and D' may be held at any desired angle to the main frame D of the machine, thus raising and lowering the pivotal connection of the forward end of the plow beam relative to the main frame of the machine. This enables the angularity of the plow beam to be changed to such an extent as to cause the plow share to run in the ground to any desired depth and to set the plow beam at such an angle as to cause the supporting roller C' thereof to be brought into engagement with the ground, thus lifting the plow share C' carried by the beam above the ground. From this construction it will be seen that while the plow beam may be set at any desired angle relative to the main frame, that such beam is free to move up and down on its pivot, without in any way affecting the hand lever G. There is therefore no danger of the hand lever flying back and striking the operator when the plow suddenly meets an obstruction, as is the case with many of the devices now in use. It will be understood that an operating lever of the character heretofore described is provided for each of the plow beams C.

The main frame A of the machine is provided with a plurality of caster wheels H for supporting the same. In the present embodiment of the invention three of such caster wheels are illustrated, two of such wheels being positioned in the forward portion of the frame and the third being positioned at the long side of the frame adjacent the rear end thereof. The caster wheels H may be secured to the main frame A in any desired manner and in the present embodiment of the invention I have shown such caster wheels as supported by bearing members H' which are bolted between the rearwardly extending bars $A^2$ of the frame.

The frame A of the machine is conveniently covered by a platform I which affords a suitable support for the operator.

While a convenient embodiment of the invention is illustrated in the accompanying drawings, it will be understood that many changes may be made to the form and construction herein shown without departing from the spirit and scope of the invention as defined in the appended claims.

I claim:—

1. In a plow, a frame, a pair of parallel links of substantially the same length pivotally connected at their forward ends to the frame, and extending rearwardly therefrom, the pivots of the links being in alinement, a plow beam pivotally connected at its forward end to the free ends of said links for movement independently thereof, a lever pivotally mounted on the frame and provided with a portion extending rearwardly therefrom, a link pivotally connected at its upper end with the rearwardly extending portion of the lever and at its lower end to the said first mentioned links, and means for locking the lever in different positions of adjustment.

2. In a plow, a frame, a pair of spaced parallel link-members of substantially the same length pivotally connected to the frame at their inner ends and extending rearwardly therefrom, a plow beam comprising two bars arranged side by side in spaced relation and rigidly secured together, a transverse pivot connecting the forward ends of the said bars with the outer ends of the respective link members, a lever pivotally mounted on the frame and provided with a portion extending rearwardly therefrom, a link having its upper end pivotally connected with said rearwardly extending portion and having its lower end pivotally connected with the said transverse pivot, and means for locking the lever in different positions of adjustment.

In testimony whereof I affix my signature in presence of two witnesses.

CARL A. BROSTROM.

Witnesses:
N. W. HANSON,
G. E. LAU.